United States Patent
Miyawaki

(10) Patent No.: US 10,245,747 B2
(45) Date of Patent: Apr. 2, 2019

(54) HANDSAW

(71) Applicant: U.M. KOGYO INC., Hyogo (JP)

(72) Inventor: Shozo Miyawaki, Hyogo (JP)

(73) Assignee: U.M. KOGYO INC., Hyogo (JP)

( * ) Notice: Subject to any disclaimer, the term of this patent is extended or adjusted under 35 U.S.C. 154(b) by 0 days.

(21) Appl. No.: 15/314,643

(22) PCT Filed: Jun. 4, 2014

(86) PCT No.: PCT/JP2014/064815
§ 371 (c)(1),
(2) Date: Nov. 29, 2016

(87) PCT Pub. No.: WO2015/186204
PCT Pub. Date: Dec. 10, 2015

(65) Prior Publication Data
US 2017/0190072 A1    Jul. 6, 2017

(51) Int. Cl.
*B27B 33/10* (2006.01)
*B27B 21/00* (2006.01)
*B23D 61/12* (2006.01)

(52) U.S. Cl.
CPC .............. *B27B 33/10* (2013.01); *B27B 21/00* (2013.01); *B23D 61/121* (2013.01)

(58) Field of Classification Search
CPC ......... B27B 33/02; B27B 33/10; B27B 21/00; B27B 21/02; B27B 21/04; Y10T 83/9319; Y10T 83/9358; Y10T 83/936; Y10T 83/9362; Y10T 83/9365; Y10T 83/9367; B23D 61/12; B23D 61/121; B26B 9/00; B26B 9/02

USPC ................ D8/20, 95–97, 64; 30/166.3, 355; 83/835, 851–855
See application file for complete search history.

(56) References Cited

U.S. PATENT DOCUMENTS

| | | | | |
|---|---|---|---|---|
| 106,187 A | * | 8/1870 | Mitzelfeld | B23D 61/121 83/850 |
| 775,012 A | * | 11/1904 | McLean | B23D 61/121 83/852 |
| 790,072 A | * | 5/1905 | McLean | B23D 61/121 83/852 |
| 2003/0029297 A1 | * | 2/2003 | Haughton | B23D 61/04 83/853 |

(Continued)

FOREIGN PATENT DOCUMENTS

| | | |
|---|---|---|
| JP | 4820157 | 6/1973 |
| JP | 523787 | 6/1975 |

(Continued)

*Primary Examiner* — Evan MacFarlane
(74) *Attorney, Agent, or Firm* — Bacon&Thomas, PLLC

(57) ABSTRACT

A handsaw with which chip clogging is eliminated significantly, the pitch of the tooth points kept fine rather than coarse, a large area secured for the cut end face, degradation in cutting caused by the chip clogging prevented sufficiently. The handsaw has a plurality of saw teeth arranged on a longitudinal edge (21) of the saw blade (20). The saw teeth are formed as prism-shaped teeth (30) each having a shape of a prism, which are configured such that at least adjacent prism-shaped teeth (30) rise at a same rising angle θ from the edge surface (21a) of the longitudinal edge (21) of the saw blade (20), to cause the space (S) between the adjacent prism-shaped teeth to be constant in the rising direction.

6 Claims, 12 Drawing Sheets

(56) References Cited

U.S. PATENT DOCUMENTS

| | | | | |
|---|---|---|---|---|
| 2004/0139617 A1* | 7/2004 | Neshat | ............... | A22B 3/10 |
| | | | | 30/355 |
| 2007/0144318 A1* | 6/2007 | Huang | ............... | B23D 65/02 |
| | | | | 83/13 |
| 2013/0139394 A1* | 6/2013 | Babaev | ............... | B23D 61/123 |
| | | | | 30/507 |

FOREIGN PATENT DOCUMENTS

| JP | 0430847 | 3/1992 |
|---|---|---|
| JP | 06071101 | 10/1994 |
| JP | 11320502 | 11/1999 |
| JP | 2002096302 A | 4/2002 |
| JP | 2003117903 A | 4/2003 |
| JP | 2013052575 A | 3/2013 |

* cited by examiner (A)

(B)

(A)

(B)

(A)

(B)

(A)

(B)

HANDSAW

TECHNICAL FIELD

The present invention relates to a handsaw.

BACKGROUND ART

Saws have a long history, and from its beginning to date, handsaws have been used by many people.

Meanwhile, electric power saws, which have been developed relatively recently, are electric power tools which cut wood and others with overwhelming horsepower supported by electric power. The same applies to chainsaws powered by engines. Although the electric power saws etc. having overwhelming power, so-called power saws, and the handsaws which cut using human power only, without relying on electric or other power, are similar in that both use cutting teeth, in practice, they are considerably different in terms of concepts regarding their structures and functions, so they belong to substantially different technical fields.

FIG. 12 shows an example of a handsaw. A handsaw is generally made up of a grip 81, called a handle, and an elongated metal saw blade 82 attached to an end of the grip 81. A large number of teeth 83 are arranged on a longitudinal edge of the saw blade 82.

The handsaw shown in FIG. 10 (A), (B) is an example of the so-called ripsaw. The ripsaw is suitable for cutting wood along the grain. The ripsaw has a large number of triangular teeth 73 arranged on the longitudinal edge of the saw blade 72, and performs cutting with the distal ends of the triangular teeth 73 as cutting edges 7P. Each triangular tooth 73 has a base that constitutes a gullet or valley 7V together with the base of the adjacent triangular tooth 73.

The handsaw shown in FIG. 11 (A), (B) is an example of the so-called crosscut saw. The crosscut saw is suitable for cutting wood across the grain. In the crosscut saw, each triangular tooth 83 formed on the longitudinal edge of the saw blade 82 has sharp vertical cutting edges 83a, 83b, called "Higaki" in Japanese, provided on a pair of front and rear beveled portions on a distal end of the tooth. The vertical cutting edge denoted as 83a is in front with respect to the cutting direction D, and the vertical cutting edge denoted as 83b is at back with respect to the cutting direction D.

The vertical cutting edges 83a, 83b cut into the wood like knives, to sever the grain. The bases of adjacent triangular teeth 83 constitute a gullet 8V.

Some known crosscut saws have a cut end face 84, called "top edge" ("Uwame" in Japanese), formed by obliquely truncating a triangular tooth 83 near its distal end, and front and rear edges of the cut end face 84 serve as horizontal cutting edges 84a and 84b. The cut end face 84 and the horizontal cutting edges 84a, 84b can achieve the function of a ripsaw, or, the function of, when cutting wood, carving and scraping off, like a chisel, a part of the wood corresponding to the thickness of the saw blade 82.

Japanese Utility Model Application Laid-Open No. H6-71101 (Patent Document 1) discloses a handsaw having triangular teeth (11) to (18), which are arranged alternately in opposite orientations to face each other and are also provided with top edges (11a) to (18a). This handsaw is similar to the crosscut saw shown in FIG. 11 described above.

Japanese Patent Application Laid-Open No. 2003-117903 (Patent Document 2) discloses a saw blade which is provided with a cutting chips reservoir (7) made up of a recess (10) formed on an outer surface of a cutting tooth (2) for the purposes of preventing the spaces between respective sides of the saw and the cut surfaces of the wood from being clogged with cutting chips.

Japanese Patent Application Laid-Open No. 2013-52575 (Patent Document 3) discloses a saw blade which has teeth formed such that base portions (3B), (3B) of adjacent teeth (3), (3) are separate through the intermediary of an arcuate groove bottom surface (20) for the purposes of preventing clogging with chips.

PRIOR ART DOCUMENTS

Patent Documents

Patent Document 1: Japanese Utility Model Application Laid-Open No. H6-71101
Patent Document 2: Japanese Patent Application Laid-Open No. 2003-117903
Patent Document 3: Japanese Patent Application Laid-Open No. 2013-52575

DISCLOSURE OF THE INVENTION

Problems to be Solved by the Invention

The handsaw of Patent Document 1 above, however, includes triangular teeth, as in the case of the handsaw shown in FIG. 11. Each gullet (V) between the adjacent triangular teeth (see FIG. 11) inevitably has a large V shape which tapers toward the bottom of the gullet. This poses a basic problem that these tapered gullets are clogged with chips, making the cutting quality or performance gradually deteriorate during the progress of the operation.

In the case of the saw blade of Patent Document 2 above, although the spaces between the respective sides of the saw and the cut surfaces of the wood may be prevented from being clogged with cutting chips, the tapered gullets between the triangular teeth would still likely be clogged with cutting chips, leaving unsolved the problem that the cutting performance gradually deteriorates during the cutting operation.

In the case of the saw blade of Patent Document 3 above, the presence of the arcuate groove bottom surface (20) may lessen chip clogging. With the use of the triangular teeth, however, there still are tapered gullets, making it hard to sufficiently eliminate the chip clogging.

Further, in the case of the saw blade of Patent Document 3, in order to secure a large arc for the arcuate groove bottom surface (20), the beveled edge portions (7A), (7B) each need to have a fairly acute bevel angle (cutting edge angle thereof). This makes each tooth (3) reduced in thickness, posing a problem of reduced strength. Furthermore, the sharp cutting edge angles of the beveled edge portions (7A), (7B) pose another problem that the area of the top edge portion (8) inevitably becomes extremely small.

Basic problems with the triangular teeth will further be mentioned. Triangular teeth have been used for handsaws since a long time ago; it has been common practice to use the triangular teeth for the handsaws.

The handsaw using the triangular teeth, however, has the basic problem as described above that there are tapered gullets between the triangular teeth, which would likely be clogged with chips.

Further, with the handsaw using the triangular teeth, there is another basic problem that the distances between tooth points at the tip ends of the teeth would likely become long, resulting in a coarse pitch in the longitudinal direction of the saw blade. When the triangular teeth are arranged more densely to make the pitch finer, the overlaps of the gullets between the respective sets of triangular teeth will increase, making chip clogging more likely to occur, leading to degradation in cutting performance. On the other hand, if the triangular teeth are arranged with larger spacing between the teeth, although the overlaps of the gullets between the triangular teeth may decrease and the chances of chip clogging may be lessened, the distances between the tooth points will become even longer, resulting in a coarser pitch, thereby worsening the cutting performance.

Further, in the case of the triangular tooth, while the tooth has a wide base, the distal end becomes narrower to be pointed. Thus, the "top edge" (cut end face 84 (see FIG. 11)) obtained by obliquely truncating the distal end would also likely become extremely small in area. With the top edge (cut end face 84) having such a small area, the shaving width becomes smaller than the saw blade width, in which case some portions may be left unshaved, and better cutting performance will not be expected.

In view of the foregoing, an object of the present invention is to solve various problems of the conventional techniques described above, with a departure from the long-held common wisdom that a handsaw should have triangular teeth, by providing a handsaw that is capable of significantly eliminating chip clogging, enabling the pitch of the tooth points to be kept fine rather than coarse, and securing a large area for an obliquely cut end face, called "top edge", of each tooth, thereby sufficiently preventing degradation in cutting performance caused by chip clogging and ensuring significantly improved cutting performance.

Means for Solving the Problems

To accomplish the above object, a handsaw according to the present invention has a first feature that it is a handsaw having a plurality of saw teeth arranged on a longitudinal edge of a saw blade, the saw teeth being configured as prism-shaped teeth each having a shape of a prism, the prism-shaped teeth being configured such that at least adjacent prism-shaped teeth rise at a same rising angle from an edge surface of the longitudinal edge of the saw blade, to cause a space between the adjacent prism-shaped teeth to be constant in a rising direction in which the teeth rise.

Further, the handsaw according to the present invention has, in addition to the above-described first feature, a second feature that the prism-shaped teeth are triangular or trapezoidal prism-shaped teeth, the prism-shaped teeth each have at least one lateral face configured to be a flush lateral face that rises flush with one of front and back surfaces of the saw blade, the prism-shaped teeth are arranged in alternating orientations one after another such that the flush lateral faces of the respective teeth are located alternately on the front and back surfaces of the saw blade, a lateral edge, among lateral edges of each prism-shaped tooth, that belongs to the flush lateral face has a vertical cutting edge formed thereon, each prism-shaped tooth has an obliquely cut end face at a tip end of the tooth obtained by obliquely truncating the prism, and among edges belonging to the obliquely cut end face, an edge that does not belong to the flush lateral face has a horizontal cutting edge formed thereon.

Further, the handsaw according to the present invention has, in addition to the above-described second feature, a third feature that the prism-shaped teeth are triangular prism-shaped teeth, each triangular prism-shaped tooth with three lateral edges on the prism has two lateral edges configured as lateral edges of the flush lateral face that rises flush with one of the front and back surfaces of the saw blade and the remaining lateral edge configured as a lateral edge that rises flush with the other of the front and back surfaces of the saw blade, and the obliquely cut end face of each triangular prism-shaped tooth is configured to become an oblique triangle that extends across the front and back surfaces of the saw blade.

Further, the handsaw according to the present invention has, in addition to the above-described third feature, a fourth feature that the triangular prism-shaped teeth are isosceles triangular prism-shaped teeth.

Further, the handsaw according to the present invention has, in addition to the above-described second feature, a fifth feature that the prism-shaped teeth are trapezoidal prism-shaped teeth, each trapezoidal prism-shaped tooth with four lateral edges on the prism has two lateral edges configured as lateral edges of the flush lateral face that rises flush with one of the front and back surfaces of the saw blade and the remaining two lateral edges configured as lateral edges of another flush lateral face that rises flush with the other of the front and back surfaces of the saw blade, and the obliquely cut end face of each trapezoidal prism-shaped tooth is configured to become an oblique quadrangle that extends across the front and back surfaces of the saw blade.

Further, the handsaw according to the present invention has, in addition to the above-described fifth feature, a sixth feature that the trapezoidal prism-shaped teeth are isosceles trapezoidal prism-shaped teeth.

Further, the handsaw according to the present invention has, in addition to any of the first through sixth features described above, a seventh feature that the prism-shaped teeth are right prism-shaped teeth or oblique prism-shaped teeth.

Further, the handsaw according to the present invention has, in addition to any of the first through seventh features described above, an eighth feature that the same angle for the rising angles of the prism-shaped teeth has a tolerance of ±10 degrees, and the space between the prism-shaped teeth being constant in the rising direction includes any space with an increase within 20 degrees in angle or a reduction within 20 degrees in angle.

Further, the handsaw according to the present invention has, in addition to the above-described eighth feature, a ninth feature that the rising angle of each prism-shaped tooth has a tolerance of ±5 degrees, and the space between the prism-shaped teeth being constant in the rising direction includes any space with an increase within 10 degrees in angle or a reduction within 10 degrees in angle.

Further, the handsaw according to the present invention has, in addition to any of the first through ninth features described above, a tenth feature that the lateral edges of each lateral face of each prism-shaped tooth are configured to rise parallel to each other or at a crossing angle of within ±10 degrees from the parallel.

Further, the handsaw according to the present invention has, in addition to the above-described tenth feature, an eleventh feature that the lateral edges of each lateral face of each prism-shaped tooth are configured to rise parallel to each other or at a crossing angle of within ±5 degrees from the parallel.

Effects of the Invention

According to the handsaw recited in a first embodiment, the saw teeth arranged on the saw blade are prism-shaped teeth, and at least adjacent prism-shaped teeth are configured to rise at a same rising angle from the edge surface of the longitudinal edge of the saw blade. This allows the space between the adjacent prism-shaped teeth to be constant in the rising direction in which the teeth rise. Accordingly, the conventional problematic structure in which the space between the teeth becomes narrower from the tip ends toward the bases of the teeth is eliminated, and the conventional disadvantage that the cutting performance deteriorates as the tapered spaces between the teeth are clogged with chips can be fully overcome.

Moreover, as the saw tooth is of the prism shape, compared to the conventional triangular tooth wider in the base and narrower at the tip end, the dimensions remain unchanged from the base toward the tip end of the tooth. Thus, with the prism-shaped teeth, it is possible to arrange the teeth more densely compared to the conventional triangular teeth. Further, with the prism-shaped teeth, the tip end of each tooth can be made wider in area compared to the conventional triangular tooth. Accordingly, it is possible to increase the arrangement density of the cutting edges formed on the saw teeth and also increase the edge dimensions of the cutting edges. This leads to a significant improvement in cutting performance itself.

According to the handsaw recited in a second embodiment, in addition to the functions and effects obtained by the configuration recited in the first embodiment, triangular or trapezoidal prism-shaped teeth are used as the prism-shaped teeth. The triangular or trapezoidal prism-shaped teeth have their flush lateral faces arranged alternately on the front and back surfaces of the saw blade, and the vertical cutting edges are formed on the alternately arranged flush lateral faces. With these vertical cutting edges arranged alternately on the right and left sides, a pair of right and left cutting grooves are cut into an object to be cut. Further, each triangular or trapezoidal prism-shaped tooth has the obliquely cut end face at the tip end, which is obtained by obliquely truncating the prism. Of the edges of the obliquely cut end face, the edge not belonging to the flush lateral face has the horizontal cutting edge formed thereon. With this horizontal cutting edge, the object to be cut is sliced off in an oblique horizontal direction as if being chiseled.

Thus, according to the handsaw recited in the second embodiment, in addition to the functions and effects obtained by the configuration recited in the first embodiment, it is possible to provide a handsaw with extremely good cutting performance which can efficiently cut an object, using the triangular or trapezoidal prism-shaped teeth, with the combination of the vertical cutting edges and the horizontal cutting edges, and which hardly suffers chip clogging in the spaces between the teeth.

Further, according to the handsaw recited in a third embodiment, in addition to the functions and effects obtained by the configuration recited in the second embodiment, the triangular prism-shaped teeth are used as the prism-shaped teeth. Each triangular prism-shaped tooth has two lateral edges configured to belong to the flush lateral face that is flush with one of the front and back surfaces of the saw blade and the remaining lateral edge configured to be flush with the other of the front and back surfaces of the saw blade. The obliquely cut end face of the triangular prism-shaped tooth thus becomes a large, oblique triangle that extends across the front and back surfaces of the saw blade, and the horizontal cutting edge formed on the edge of the triangle of the obliquely cut end face becomes a long cutting edge that extends across the front and back surfaces of the saw blade. Accordingly, it is possible to provide a handsaw with extremely good cutting performance which is expected to ensure efficient slicing of an object in the oblique horizontal directions with the large horizontal cutting edges extending across the front and back of the saw blade, without leaving any unshaved portion on the object within the thickness of the saw blade.

Further, according to the handsaw recited in a fourth embodiment, in addition to the functions and effects obtained by the configuration recited in the third embodiment, isosceles triangular prism-shaped teeth are used as the triangular prism-shaped teeth. Thus, the lateral faces facing each other and belonging respectively to the adjacent triangular prism-shaped teeth can be arranged in parallel. Accordingly, the space between the adjacent triangular prism-shaped teeth becomes constant, not only in the rising direction in which the saw teeth rise, but also in the direction perpendicular to the rising direction. This enables stable cutting operations, and also ensures good cutting performance.

Further, according to the handsaw recited in a fifth embodiment, in addition to the functions and effects obtained by the configuration recited in the second embodiment, trapezoidal prism-shaped teeth are used as the prism-shaped teeth. Of the trapezoidal prism-shaped tooth, two lateral faces opposite to each other become flush lateral faces which are respectively flush with the front and back surfaces of the saw blade, and the remaining two lateral faces opposite to each other become faces which each traverse from the front surface to the back surface of the saw blade. As a result, the obliquely cut end face of the trapezoidal prism-shaped tooth becomes a large, oblique trapezoid that extends across the front and back surfaces of the saw blade, and accordingly, the horizontal cutting edge formed on the edge of the trapezoid of the obliquely cut end face becomes a long cutting edge extending across the front and back surfaces of the saw blade. Accordingly, it is possible to provide a handsaw with good cutting performance which is expected to ensure efficient slicing of an object in the oblique horizontal directions with the large and long horizontal cutting edges extending from the front to the rear of the saw blade, as in the case of the obliquely cut end faces of the triangular prism-shaped teeth recited in the third embodiment.

Further, according to the handsaw recited in a sixth embodiment, in addition to the functions and effects obtained by the configuration recited in the fifth embodiment, isosceles trapezoidal prism-shaped teeth are used as the trapezoidal prism-shaped teeth. This allows the lateral faces facing each other and belonging respectively to the adjacent trapezoidal prism-shaped teeth to be arranged parallel to each other. Accordingly, the space between the adjacent trapezoidal prism-shaped teeth becomes constant not only in the rising direction in which the saw teeth rise, but also in the direction perpendicular to the rising direction. It is therefore possible to ensure stable cutting performance.

Further, according to the handsaw recited in a seventh embodiment, in addition to the functions and effects obtained by the configuration recited in any of the first to sixth embodiments, right prism-shaped teeth or oblique prism-shaped teeth can be used as the prism-shaped teeth, so that a handsaw that hardly suffers chip clogging and ensures good cutting performance can be provided, not only for the handsaw having prism-shaped teeth arranged as right prisms to rise at a right angle from the edge surface of the edge of the saw blade, but also for the handsaw having prism-shaped teeth arranged as oblique prisms to rise obliquely from the edge surface of the edge of the saw blade.

Further, according to the handsaw recited in an eighth embodiment, in addition to the functions and effects obtained by the configuration recited in any of the first to seventh embodiments, the adjacent prism-shaped teeth rise at a same angle, and this same angle is configured to have a tolerance of ±10 degrees. On the basis of such a tolerance of ±10 degrees of the rising angles of the prism-shaped teeth, any space between the prism-shaped teeth in the teeth rising direction that falls within the permissible range of an increase within 20 degrees in angle or a reduction within 20 degrees in angle can be regarded as being constant. Even if the space between the prism-shaped teeth is enlarged or reduced within 20 degrees in angle in the rising direction, the variation within such a range does not create an adverse result that the spaces between the teeth are clogged with chips, or does not adversely affect the cutting performance of the saw.

Further, according to the handsaw recited in a ninth embodiment, in addition to the functions and effects obtained by the configuration recited in the eighth embodiment, the rising angles of the prism-shaped teeth are considered to be the same with a tolerance of ±5 degrees. On the basis of this, the space between the prism-shaped teeth in the teeth rising direction is allowed to be enlarged or reduced in the permissible range of within ten degrees in angle. When the variation of the space between the prism-shaped teeth is within the permissible range of ten degrees in angle in the rising direction, it is possible to sufficiently effectively prevent chip clogging in the spaces between the teeth, and to keep sufficiently favorable cutting performance of the saw.

Further, according to the handsaw recited in a tenth embodiment, in addition to the functions and effects obtained by the configuration recited in any of the first to ninth embodiments, it is permitted that the lateral edges of each lateral face of each prism-shaped tooth rise parallel to each other or rise obliquely at a crossing angle within ±10 degrees from the parallel. Even if the prism of the prism-shaped tooth is reduced or enlarged in such a range within ten degrees in the rising direction, the teeth can exert the geometric characteristics as the prism-shaped teeth as long as the variation falls within that range. They do not create an adverse result that the spaces between the teeth are clogged with chips, or do not adversely affect the cutting performance of the saw.

Further, according to the handsaw recited in an eleventh embodiment, in addition to the functions and effects obtained by the configuration recited in the tenth embodiment, the lateral edges of each lateral face of each prism-shaped tooth preferably rise parallel to each other or rise obliquely at a crossing angle within ±5 degrees from the parallel. When the reduction or enlargement of the prism-shaped tooth in the rising direction of the prism falls within the range of not greater than five degrees, the teeth can sufficiently exert the geometric characteristics as the prism-shaped teeth. It is possible to sufficiently effectively prevent chip clogging in the spaces between the teeth, and to keep sufficiently favorable cutting performance of the saw.

MODES FOR CARRYING OUT THE INVENTION

Handsaws according to embodiments of the present invention will be described with reference to the drawings below.

First, a first embodiment will be described with reference to FIGS. 1 to 5.

Figure 1:
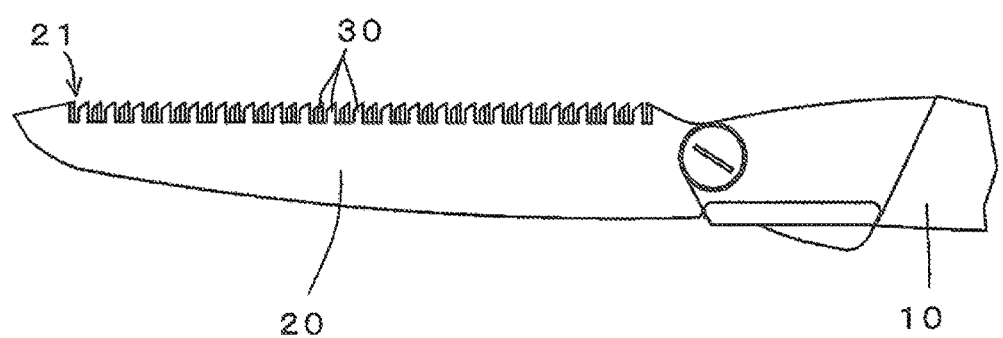
FIG. 1 is a front view of a handsaw according to a first embodiment of the present invention.

Referring to FIG. 1, a handsaw has a grip 10, a saw blade 20, and saw teeth 30. The grip 10 is only partly shown in the figure.

While the handsaw shown is a folding handsaw with the saw blade 20 foldable into the grip 10, the handsaw does not necessarily have to be of the folding type; any types of handsaws can be adapted.

The handsaw is a so-called single-edged saw, having the saw teeth 30 arranged on one longitudinal edge 21 of the saw blade 20. Alternatively, it may of course be a double-edged saw with saw teeth 30 arranged on both longitudinal edges 21 of the saw blade 20.

Further, while the handsaw shown in FIG. 1 is a pull-type saw, it may be a push-type saw.

Referring to FIGS. 2 to 5 as well, the saw teeth are configured as prism-shaped teeth 30 in the first embodiment.

The prism-shaped teeth 30 are configured to rise from an edge surface 21a of a longitudinal edge 21 of the saw blade 20.

For the prism-shaped teeth 30, rising angles $\theta$ are set to be constant such that they rise in a same direction from the edge surface 21a. In the first embodiment, the rising angle $\theta$ of each prism-shaped tooth 30 is set to be a right angle of 90 degrees. The rising angle $\theta$ of each prism-shaped tooth is not limited to the right angle; the teeth may be slanted as long as their angles are constant.

With the rising angle $\theta$ constant for each prism-shaped tooth 30, a space S between each pair of adjacent prism-shaped teeth 30 becomes constant in the rising direction of the prism-shaped teeth. This eliminates the conventional problematic structure in which the space between the teeth becomes narrower from the tip ends toward the bases of the teeth. It is thus possible to fully solve the conventional disadvantage that the cutting performance deteriorates with the tapered spaces between the teeth clogged with chips.

Incidentally, in order to make the space S between the adjacent prism-shaped teeth 30 constant in the rising direction of the prism-shaped teeth, it is only necessary that at least adjacent prism-shaped teeth 30, 30 rise at a same rising angle θ from the edge surface 21a of the longitudinal edge 21 of the saw blade 20. When the adjacent prism-shaped teeth 30, 30 have the same rising angle θ, the space S between the prism-shaped teeth 30, 30 becomes constant in the teeth rising direction, thereby solving the disadvantage that the space between the teeth becomes narrower from the tip ends toward the bases of the teeth.

It should be noted that the term "constant" used for the rising angle θ does not mean a constant value in the strict sense. Similarly, the term "same angle" used for the rising angle θ does not have to be a same angle in the strict sense. For the term "constant" used for the space S between the adjacent prism-shaped teeth 30 as well, it does not have to be constant in the strict sense. These concepts each embrace more or less increase or decrease permitted based on the objects, functions, and effects of the present invention, which will be described later.

The prism-shaped teeth 30 according to the first embodiment are triangular prism-shaped teeth made up of triangular prisms.

A triangular prism-shaped tooth 30 has three lateral edges 30a, 30b, 30c and three lateral faces 31, 32, 33 which rise from the edge surface 21a of the longitudinal edge 21 of the saw blade 20.

The triangular prism-shaped tooth 30 also has an obliquely cut end face 34 at its tip end obtained by obliquely truncating the triangular prism.

The obliquely cut end face 34 has three edges 34a, 34b, and 34c. The edge 34a corresponds to the upper side of the lateral face 31, the edge 34b corresponds to the upper side of the lateral face 32, and the edge 34c corresponds to the upper side of the lateral face 33.

A triangular prism-shaped tooth 30 has one of its lateral faces configured to be a flush lateral face 31 that rises flush with one surface, 20a or 20b, of a front surface 20a and a back surface 20b of the saw blade 20.

The triangular prism-shaped teeth 30 are arranged alternately in opposite orientations one after another, such that the flush lateral faces 31 of the respective triangular prism-shaped teeth 30 become flush alternately with the front surface 20a and the back surface 20b of the saw blade 20.

In each triangular prism-shaped tooth 30, the angle (lateral edge 30b) opposite the flush lateral face 31 is configured to be located in an intermediate position between the lateral edges 30a and 30c of the flush lateral face 31 in the longitudinal direction of the saw blade 20. In other words, the triangle of each triangular prism-shaped tooth 30 is shaped such that the crossing angles α1, α2 between the flush lateral face 31 and the respective adjacent lateral faces 32, 33 both become less than 90 degrees.

In the case of the triangular prism-shaped teeth 30 in the first embodiment, the crossing angles α1 and α2 are set to be a same angle less than 90 degrees, so that the teeth each become an isosceles triangular prism-shaped tooth formed with the isosceles triangle which is bilaterally symmetrical.

With the isosceles triangular prism-shaped teeth 30 adopted as the prism-shaped teeth, when the isosceles triangular prism-shaped teeth 30 are arranged in alternating orientations one after another on the longitudinal edge 21 of the saw blade 20, the lateral faces 32 and 33 facing each other and belonging respectively to the adjacent isosceles triangular prism-shaped teeth 30, 30 become parallel as seen in a plan view. That is, the space S between the adjacent isosceles triangular prism-shaped teeth 30 can be made constant in a plan view (in the direction perpendicular to the rising direction as well).

Each triangular prism-shaped tooth 30, with the lateral edges 30a and 30c belonging to the flush lateral face 31, is configured such that a front vertical cutting edge VE1 is provided on the longer lateral edge 30a located frontward in a cutting direction D and a rear vertical cutting edge VE2 is provided on the shorter lateral edge 30c located rearward in the cutting direction D.

Here, the cutting direction D refers to the direction in which the saw is pulled in the case of a pull-type saw. In the case of a push-type saw, it refers to the direction in which the saw is pushed.

The edge angle of the front vertical cutting edge VE1 (or, the crossing angle α1 between the lateral faces 31 and 32) and the edge angle of the rear vertical cutting edge VE2 (or, the crossing angle α2 between the lateral faces 31 and 33) are both set to be an acute angle less than 90 degrees, preferably an acute angle less than 45 degrees.

The front vertical cutting edge VE1 is a main vertical cutting edge that cuts a V-shaped groove into an object to be cut as the saw blade 20 moves in the cutting direction D. The rear vertical cutting edge VE2 is a subordinate vertical cutting edge relative to the front vertical cutting edge VE1, although it is able to make a V-shaped cut in the object as the saw blade 20 returns in the direction opposite to the cutting direction D.

Each triangular prism-shaped tooth 30, with three edges 34a, 34b, 34c belonging to the obliquely cut end face 34 formed at its tip end, is configured such that a front horizontal cutting edge HE1 is provided on the edge 34b not belonging to the flush lateral face 31 and located frontward in the cutting direction D, and a rear horizontal cutting edge HE2 is provided on the edge 34c not belonging to the flush lateral face 31 and located rearward in the cutting direction D.

The edge angle of the front horizontal cutting edge HE1 corresponds to a crossing angle between the obliquely cut end face 34 and the lateral face 32 functioning as the edge face of the front vertical cutting edge VE1. This crossing angle is set to be less than 90 degrees. The front horizontal cutting edge HE1 and the front vertical cutting edge VE1 meet at a tooth point P of the triangular prism-shaped tooth 30.

As the saw blade 20 moves in the cutting direction D, the front horizontal cutting edge HE1 slices the surface of an object in an oblique horizontal direction, like chiseling. The rear horizontal cutting edge HE2 helps force the chips out of the cut groove of the object as the saw blade 20 moves in the direction opposite to the cutting direction D.

In the present embodiment, the obliquely cut end face 34 is formed by truncating the prism obliquely downward at a constant inclination angle with the tooth point P as the apex. More specifically, the prism is truncated obliquely downward such that the slope of the edge 34b serving as the front horizontal cutting edge HE1 from the tooth point P becomes steeper than the slope of the edge 34a of the obliquely cut end face 34 from the tooth point P.

It is needless to say that any angles may be adopted, as required, as the inclination angles with the tooth point P as the apex.

Further, although not shown in the figure, a triangular prism-shaped tooth having an obliquely cut face that is cut in a manner different from the above-described obliquely cut end face 34 can also be adopted. Examples of such differently cut faces include an obliquely cut face (hereinafter, referred to as "different-type obliquely cut end face") formed, with the distal end of the lateral edge 30b as an apex instead of the tooth point P (distal end of 30a), by truncating the prism obliquely downward from the apex, or, the distal end of the lateral edge 30b, at a constant inclination angle.

This different-type obliquely cut face is more specifically configured such that the slope of the edge 34c from the distal end of the lateral edge 30b becomes steeper than the slope of the edge 34b that extends toward the tooth point P (distal end of 30a) from the distal end of the lateral edge 30b.

A triangular prism-shaped tooth (similarly, a trapezoidal prism-shaped tooth described later) having this different-type obliquely cut end face is superior in the function of forcing the chips out of the cut groove of the object being cut. Such teeth can thus be added in places to the array of the triangular prism-shaped teeth 30 having the above-described obliquely cut end faces 34.

Chips cut off by a triangular prism-shaped tooth 30 temporarily remain in the space S between the lateral face 32 of the triangular prism-shaped tooth 30 and its neighboring triangular prism-shaped tooth 30 in front. Each triangular prism-shaped tooth 30, however, is of the prism shape, having dimensions unchanged from the base toward the tip end of the tooth 30. Moreover, every triangular prism-shaped tooth 30 has a constant rising angle θ and rises in the same direction. For example, they all rise at a right angle in the same direction. Therefore, the space S between each pair of adjacent triangular prism-shaped teeth 30 becomes constant in the rising direction of the triangular prism-shaped teeth 30. That is, a sufficient space S is secured between the teeth 30 down to the bottom of the space S, without tapering toward the bottom. This fully eliminates the conventional disadvantage that the chips are forcibly pushed toward the bottom of the space S over time; substantially no chip clogging occurs over time. Accordingly, the saw keeps good cutting performance, which would otherwise deteriorate due to the chip clogging.

The triangular prism-shaped tooth 30 is of the prism shape, with no reduction in dimensions from the base toward the tip end of the tooth. Thus, compared to the conventional triangular tooth, the obliquely cut end face 34 formed at the tip end of the tooth 30 can be made sufficiently large in area, and the horizontal cutting edges HE1 and HE2 formed on the obliquely cut end face 34 can be made sufficiently long in edge length. This ensures a sufficiently wide slicing width by the horizontal cutting edges HE1 and HE2, leading to improved slicing performance.

Further, as the triangular prism-shaped tooth 30 is of the prism shape, compared to the conventional triangular tooth, a thin tooth with a smaller base can be used to form an obliquely cut end face 34 of the same area. Thus, in the case of arranging the teeth at the same pitch, the area of each obliquely cut end face 34 can be made large and the dimensions between the bases of the teeth can also be increased with the triangular prism-shaped teeth 30, than with the conventional triangular teeth. The greater clearance between the bases of the teeth means that chip clogging is less likely to occur. The larger area of the obliquely cut end face 34 means that the horizontal cutting edges HE1 and HE2 offer better slicing performance.

On the other hand, when the dimensions between the teeth are made the same, compared to the conventional triangular teeth, a larger number of triangular prism-shaped teeth 30 can be arranged at a finer pitch, leading to a further improvement of the cutting performance of the saw.

Further, with the isosceles triangular prism-shaped teeth adopted as the triangular prism-shaped teeth 30, the lateral faces 32 and 33 facing each other and belonging respectively to the adjacent prism-shaped teeth 30 become parallel as seen in a plan view. Thus, the dimensions of the space S become constant and unchanged in the direction perpendicular to the rising direction as well. This lessens uneven distribution of the chips within the space S, whereby more stable cutting operations and cutting performance can be expected.

In the first embodiment, each triangular prism-shaped tooth 30 is configured such that, of its three lateral edges 30a, 30b, and 30c, two lateral edges 30a and 30c constitute lateral edges of the flush lateral face 31 that rises flush with one of the front and back surface 20a (20b) of the saw blade 20, and the remaining lateral edge 30b constitutes a lateral edge that rises flush with the other surface 20b (20a) of the saw blade 20. With this, it is configured such that each obliquely cut end face 34 becomes an oblique triangle that extends across the front and back surfaces 20a, 20b of the saw blade 20.

With each obliquely cut end face 34 being configured as the oblique triangle extending across the front and back surfaces 20a, 20b of the saw blade 20, the horizontal cutting edges HE1, HE2 formed on the obliquely cut end face 34 each have the edge length (cutting edge length) that spans the entire thickness of the saw blade 20 between the front and back surfaces 20a and 20b.

With the horizontal cutting edges HE1, HE2 formed on each obliquely cut end face 34 being made to traverse the entire thickness of the saw blade 20, during an operation of cutting an object, each horizontal cutting edge HE1, HE2 can shave the object over the entire area in the thickness direction of the saw blade 20.

If each horizontal cutting edge HE1, HE2 extends to cover less than a half in thickness direction of the saw blade 20, the horizontal cutting edges HE1, HE2 will not be able to shave an object over the entire area in the thickness direction of the saw blade, in which case some part of the object may remain unshaved where the horizontal cutting edges only come into friction contact therewith. This is often the case with the conventional triangular teeth, and would lead to poor cutting performance and poor cutting efficiency.

When each horizontal cutting edge HE1, HE2 extends to cover more than a half in thickness of the saw blade 20, with the triangular prism-shaped teeth 30 arranged alternately in opposite orientations one after another, each horizontal cutting edge HE1, HE2 can work together with the adjacent corresponding cutting edge as a pair, to shave the object over the entire area in the thickness direction of the saw blade 20, without leaving unshaved portions. According to the handsaw of the present invention, it is readily possible to increase the area of the obliquely cut end face 34, and it is also readily possible to cause each horizontal cutting edge HE1, HE2 to span more than a half in thickness direction of the saw blade 20. It however is more preferable that each horizontal cutting edge HE1, HE2 traverses the entire thickness of the saw blade 20 from the standpoint of cutting performance and also from the standpoint of strength of the tooth.

Figure 6:
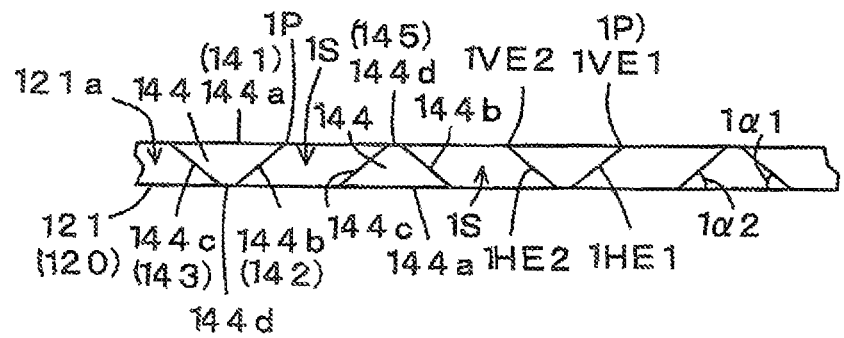
FIG. 6 shows details of a handsaw according to a second embodiment of the present invention, where (A) is a plan view and (B) is a front view.
Figure 6:
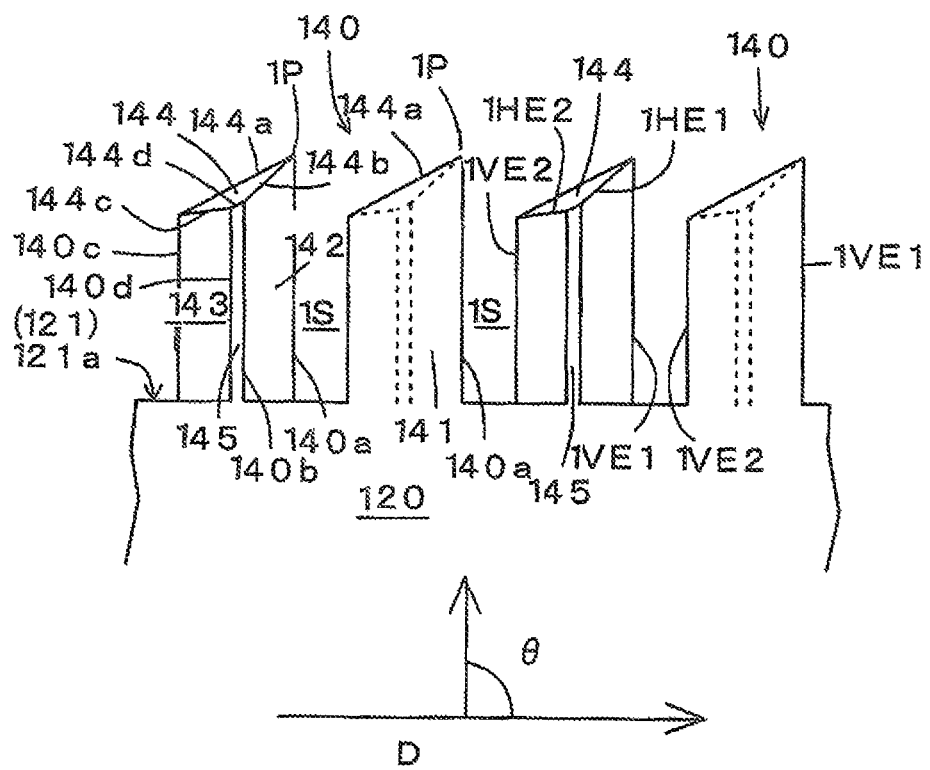

A second embodiment of the present invention will be described with reference to FIG. 6.

In the handsaw according to the second embodiment, trapezoidal prism-shaped teeth 140 are used as the prism-shaped teeth.

The triangular prism-shaped tooth 30 according to the first embodiment described above has a base of a triangular shape. When a corner of this triangle opposite its base is cut off, the base of the prism attains a trapezoidal shape. The second embodiment has such trapezoidal prism-shaped teeth 140 arranged on an edge surface 121*a* of a longitudinal edge 121 of a saw blade 120.

Each trapezoidal prism-shaped tooth 140 is configured such that, among four lateral edges 140*a*, 140*b*, 140*c*, and 140*d* on the prism, two lateral edges 140*a* and 140*c* constitute lateral edges of a flush lateral face 141 that rises flush with one of front and back surfaces 120*a* (120*b*) of the saw blade 120, and the remaining two lateral edges 140*b* and 140*d* constitute lateral edges of a second flush lateral face 145 that rises flush with the other of the front and back surfaces 120*b* (120*a*) of the saw blade 120. The second flush lateral face 145 is smaller in area than the flush lateral face 141.

Each trapezoidal prism-shaped tooth 140 has two lateral faces 142, 143 in addition to the flush lateral face 141 and the second flush lateral face 145.

The trapezoidal prism-shaped teeth 140 are configured such that they rise in a same direction from the edge surface 121*a* of the lateral edge 121 of the saw blade 120, or, such that their rising angles θ become constant. The rising angle θ of the trapezoidal prism-shaped teeth 140 in the second embodiment is 90 degrees, or, perpendicular. The rising angle θ of each trapezoidal prism-shaped tooth is not limited to the right angle; the teeth may be slanted as long as their angles are constant.

The trapezoidal prism-shaped tooth 140 has an obliquely cut end face 144 at its tip end obtained by obliquely truncating the trapezoidal prism.

The obliquely cut end face 144 has four edges 144*a*, 144*b*, 144*c*, and 144*d*. The edge 144*a* corresponds to the upper side of the flush lateral face 141, the edge 144*b* corresponds to the upper side of the lateral face 142, the edge 144*c* corresponds to the upper side of the lateral edge 143, and the edge 144*d* corresponds to the upper side of the second flush lateral face 145.

The trapezoidal prism-shaped teeth 140 are arranged in alternating orientations one after another, such that their respective flush lateral faces 141 become flush alternately with the front surface 120*a* and the back surface 120*b* of the saw blade 120.

In each trapezoidal prism-shaped tooth 140, the crossing angles 1α1, 1α2 between the flush lateral face 141 and the respective adjacent lateral faces 142, 143 both become less than 90 degrees.

In the case of the trapezoidal prism-shaped tooth 140 according to the second embodiment, it is configured as an isosceles trapezoidal prism-shaped tooth 140 with a base of a bilaterally symmetrical isosceles trapezoid.

With the isosceles trapezoidal prism-shaped teeth 140 adopted, when the isosceles trapezoidal prism-shaped teeth 140 are arranged in alternating orientations one after another on the longitudinal edge 121 of the saw blade 120, the lateral faces 142 and 143 facing each other and belonging respectively to the adjacent isosceles trapezoidal prism-shaped teeth 140, 140 become parallel as seen in a plan view. That is, the space 1S between the adjacent isosceles trapezoidal prism-shaped teeth 140 can be made constant in a plan view (in the direction perpendicular to the rising direction as well).

Each trapezoidal prism-shaped tooth 140, with the lateral edges 140*a* and 140*c* belonging to the flush lateral face 141, is configured such that a front vertical cutting edge 1VE1 is provided on the longer lateral edge 140*a* located frontward in the cutting direction D and a rear vertical cutting edge 1VE2 is provided on the shorter lateral edge 140*c* located rearward in the cutting direction D. The edge angle of the front vertical cutting edge 1VE1 (or, the crossing angle 1α1 between the lateral faces 141 and 142) and the edge angle of the rear vertical cutting edge 1VE2 (or, the crossing angle 1αg between the lateral faces 141 and 143) are both set to be an acute angle less than 90 degrees, preferably an acute angle less than 45 degrees.

The rear vertical cutting edge 1VE2 is a subordinate vertical cutting edge relative to the front vertical cutting edge 1VE1, although it is able to make a V-shaped cut in the object as the saw blade 120 returns in the direction opposite to the cutting direction D.

In each trapezoidal prism-shaped tooth 140, a front horizontal cutting edge 1HE1 and a rear horizontal cutting edge 1HE2 are provided on the edges 144*b* and 144*c*, respectively, of the obliquely cut end face 144 formed at the tip end of the tooth. The front horizontal cutting edge 1HE1 is located frontward in the cutting direction D, and is formed to obliquely traverse the thickness of the saw blade 120. The rear horizontal cutting edge 1HE2 is located rearward in the cutting direction D.

The edge angle of the front horizontal cutting edge 1HE1 corresponds to a crossing angle between the obliquely cut end face 144 and the lateral face 142 functioning as the edge face of the front vertical cutting edge 1VE1. This crossing angle is set to be less than 90 degrees. The front horizontal cutting edge 1HE1 and the front vertical cutting edge 1VE1 meet at a tooth point 1P of the trapezoidal prism-shaped tooth 140.

Chips cut off by a trapezoidal prism-shaped tooth 140 temporarily remain in the space 1S in front of the trapezoidal prism-shaped tooth 140. However, the space 1S between each pair of teeth 140 does not taper; rather, a sufficient space is secured to the bottom of the space 1S in accordance with the configuration described above. Accordingly, there occurs no degradation in cutting performance of the saw due to the chips pushed toward the bottom of the space 1S over time. The saw keeps good cutting performance.

In the case of the trapezoidal prism-shaped teeth 140, compared to the triangular prism-shaped teeth 30, the teeth themselves can be increased in strength, although each tooth may take a longer width in the longitudinal direction of the saw blade 120.

Other functions and effects of the handsaw using the trapezoidal prism-shaped teeth 140 are similar to the functions and effects described above for the handsaw using the triangular prism-shaped teeth 30.

Figure 7:
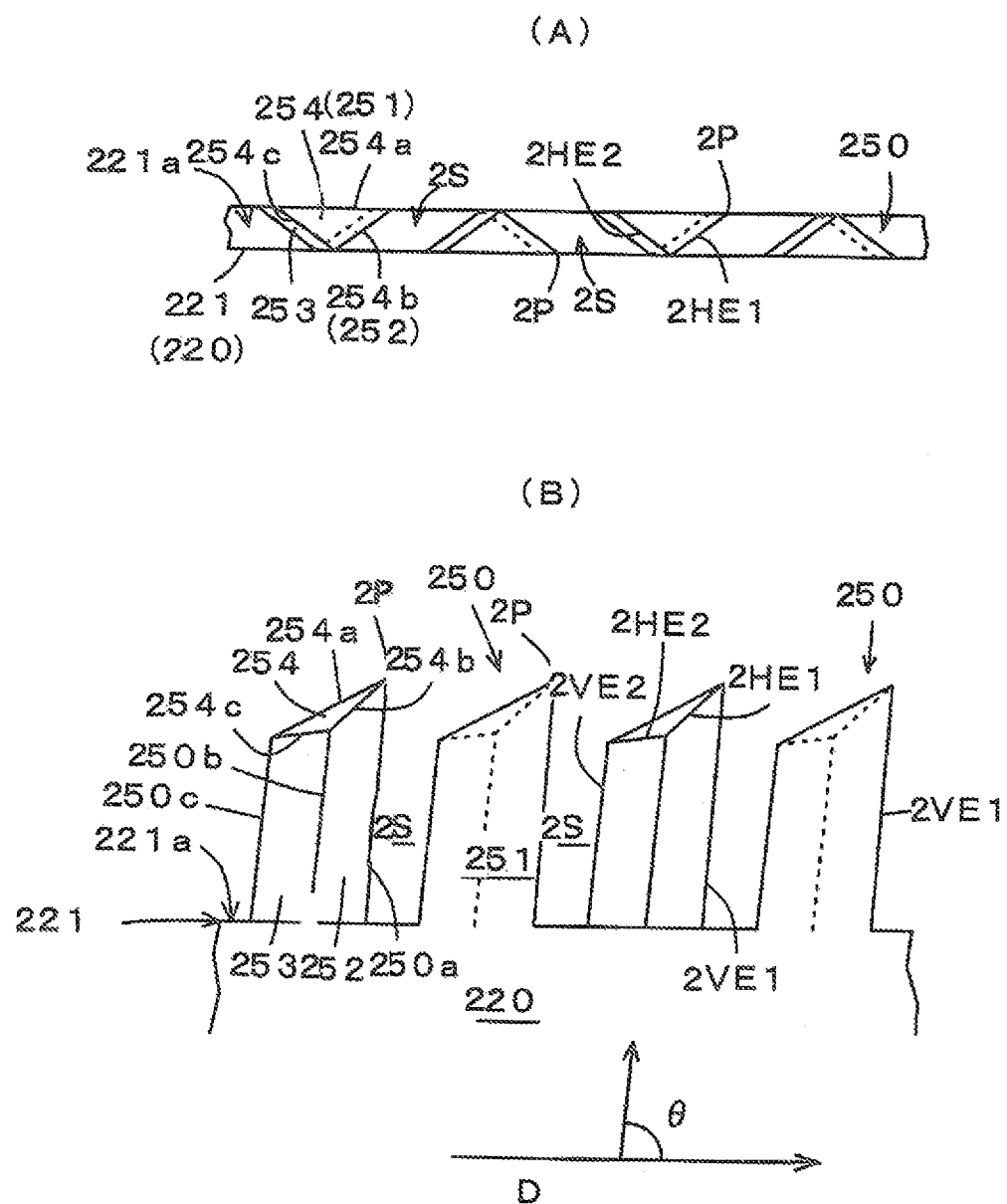
FIG. 7 shows details of a handsaw according to a third embodiment of the present invention, where (A) is a plan view and (B) is a front view.

A third embodiment of the present invention will be described with reference to FIG. 7.

The handsaws according to the first and second embodiments described above have right prism-shaped teeth as the prism-shaped teeth 30 and 140, respectively. The triangular prism-shaped teeth 30 and the trapezoidal prism-shaped teeth 140 both rise at a right rising angle θ from the edge surface 21*a* (121*a*) of the longitudinal edge 21 (121) of the corresponding saw blade 20 (120).

A handsaw according to the third embodiment has oblique prism-shaped teeth 250 which rise at an oblique rising angle θ from an edge surface 221a of a longitudinal edge 221 of a saw blade 220.

The rising angle θ of the oblique prism-shaped teeth 250 is often set as a constant angle slightly inclined toward the cutting direction D of the handsaw from the right angle, besides the right angle of 90 degrees. With the rising angle θ thus set constant, the space 2S between the adjacent oblique prism-shaped teeth 250, 250 becomes constant in the rising direction of the teeth 250. This prevents the space 2S from tapering toward the bases of the teeth, and ensures that the space 2S with sufficient dimensions is secured.

Although the rising angle θ of the oblique prism-shaped teeth 250 is not necessarily limited, it is preferably set within ±30 degrees from the perpendicular direction (90 degrees).

Other features of the handsaw of the third embodiment having the oblique prism-shaped teeth 250 are similar to those of the handsaw of the first embodiment.

The reference characters with any number from 30 to 39 for the right triangular prism-shaped tooth 30 in the first embodiment, the lateral faces 31, 32, 33, obliquely cut end face 34, lateral edges 30a, 30b, 30c, and edges 34a, 34b, 34c correspond respectively to lateral faces 251, 252, 253, obliquely cut end face 254, lateral edges 250a, 250b, 250c, and edges 254a, 254b, 254c of the oblique triangular prism-shaped tooth 250.

Further, the reference characters for the space 2S, vertical cutting edges 2VE1, 2VE2, horizontal cutting edges 2HE1, 2HE2, and apex 2P are identical to those used in the first embodiment.

A fourth embodiment of the present invention will be described with reference to FIG. 8.

Figure 8:
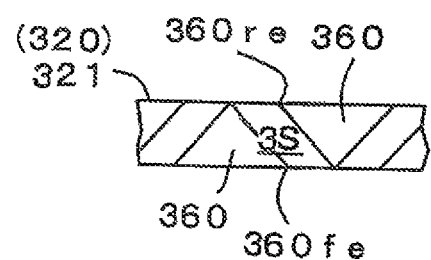
FIG. 8 shows details of a handsaw according to a fourth embodiment of the present invention, where (A) is a plan view of triangular prism-shaped teeth and (B) is a plan view of trapezoidal prism-shaped teeth.
Figure 8:
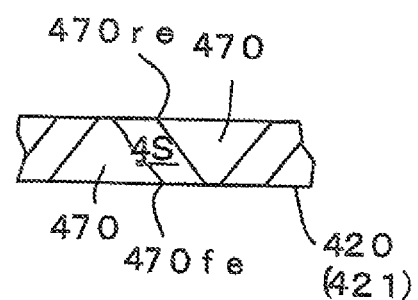

The handsaw in the fourth embodiment uses triangular prism-shaped teeth (see FIG. 8 (A)) or trapezoidal prism-shaped teeth (see FIG. 8 (B)) as the prism-shaped teeth, which are similar to the triangular prism-shaped teeth 30 and 250 according to the first and third embodiments and to the trapezoidal prism-shaped teeth 140 according to the second embodiment.

On the other hand, in the handsaw according to the fourth embodiment, the triangular prism-shaped teeth 360, 360 (see FIG. 8 (A)) or the trapezoidal prism-shaped teeth 470, 470 (see FIG. 8 (B)) are arranged relatively densely. This results in a configuration in which a tooth 360 (470) closer to the front in the longitudinal direction of the saw blade 320 (420) has its rear end 360re (470re) located behind a front end 360fe (470fe) of another tooth 360 (470) immediately behind the tooth 360 (470). The space 3S (4S) thus has its major part hidden behind the tooth 360 (470). With this configuration as well, the space 3S (4S) is kept constant in width in the rising direction of the teeth 360 (470), instead of the space 3S (4S) being narrowed toward the bases of the teeth. Such a handsaw according to the fourth embodiment is also within the scope of the present invention.

A fifth embodiment of the present invention will be described with reference to FIG. 9.

Figure 9:
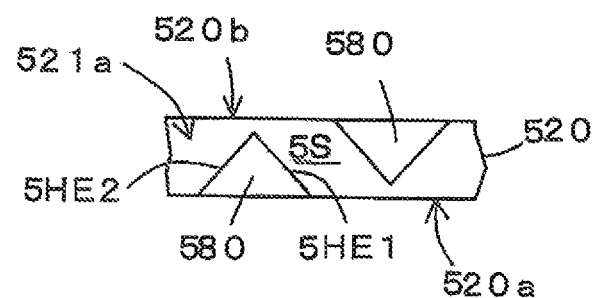
FIG. 9 shows details of a handsaw according to a fifth embodiment of the present invention, where (A) is a plan view of triangular prism-shaped teeth and (B) is a plan view of trapezoidal prism-shaped teeth.
Figure 9:
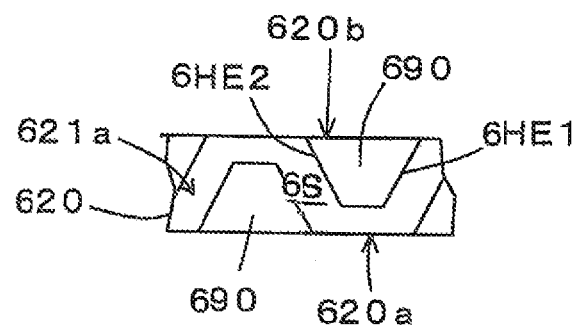
Figure 10:
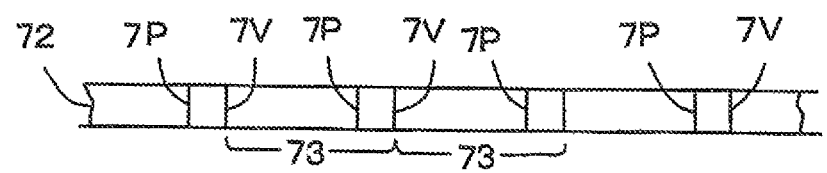
FIG. 10 shows an example of a conventional ripsaw, where (A) is a plan view and (B) is a perspective view observed from the front side.
Figure 10:
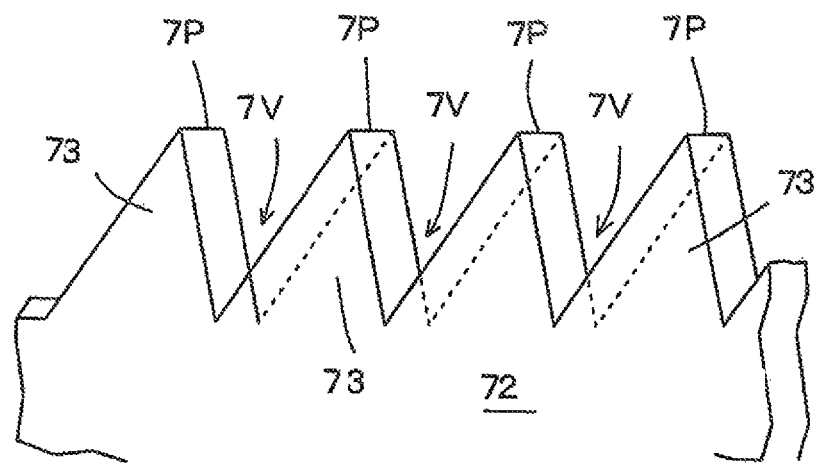
Figure 11:
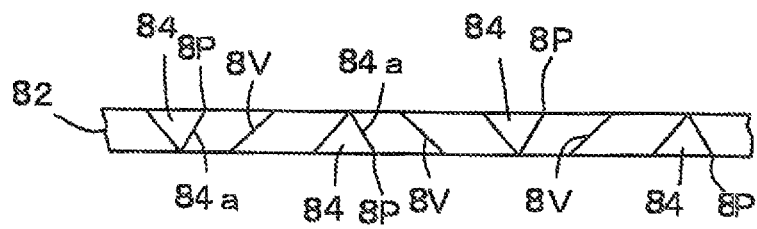
FIG. 11 shows an example of a conventional crosscut saw, where (A) is a plan view and (B) is a front view.
Figure 11:
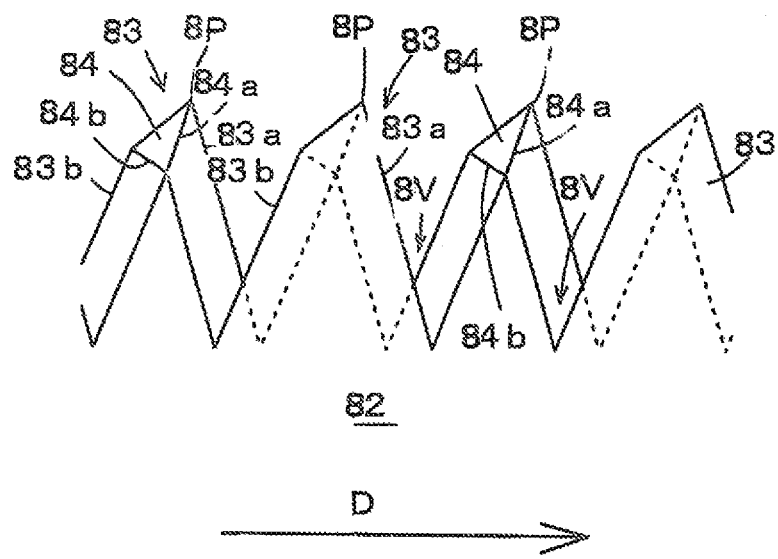
Figure 12:
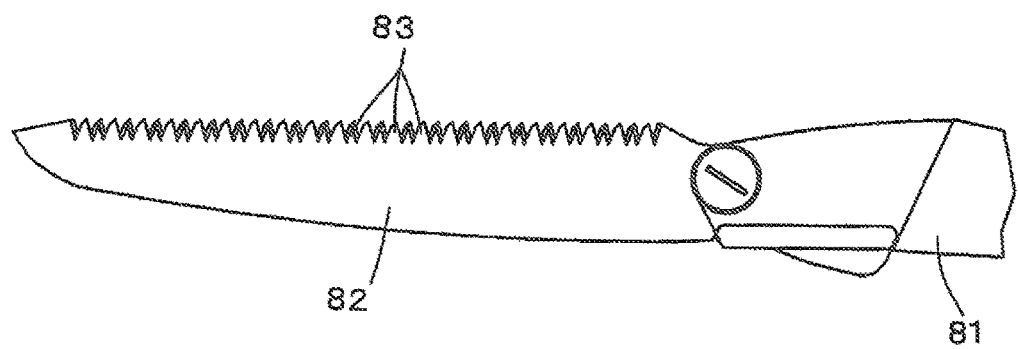
FIG. 12 shows an example of a conventional handsaw.

The handsaw in the fifth embodiment also uses triangular prism-shaped teeth (see FIG. 9 (A)) or trapezoidal prism-shaped teeth (see FIG. 9 (B)) as the prism-shaped teeth, which are similar to the triangular prism-shaped teeth 30 and 250 according to the first and third embodiments and to the trapezoidal prism-shaped teeth 140 according to the second embodiment.

On the other hand, in the handsaw according to the fifth embodiment, the triangles of the triangular prism-shaped teeth 580 (see FIG. 9 (A)) and the trapezoids of the trapezoidal prism-shaped teeth 690 (see FIG. 9 (B)) are small in size; they do not extend from the front surface 520a (620a) to the back surface 520b (620b) of the saw blade 520 (620).

Even such triangular prism-shaped teeth 580 and the trapezoidal prism-shaped teeth 690, not extending across the front and back surfaces 520a (620a) and 520b (620b) of the saw blade 520 (620), are considered to be the teeth applicable to the handsaw of the present invention, from the standpoint that they have the functions as the prism-shaped teeth.

With the triangular prism-shaped teeth 580 or the trapezoidal prism-shaped teeth 690 which are not formed over the entire area in the thickness direction of the saw blade 520 (620), however, the horizontal cutting edges 5HE1, 5HE2 (6HE1, 6HE2) formed on their obliquely cut end faces are not formed over the entire area in the thickness direction of the saw blade 520 (620) either. The saw thus has a portion within the thickness of the saw blade 520 (620) in which it cannot cut an object with the horizontal cutting edges 5HE1, 5HE2 (6HE1, 6HE2). This leads to degradation in cutting performance of the handsaw.

It is thus preferable, as shown in FIGS. 9 (A) and (B), that the triangle of each triangular prism-shaped tooth 580 and the trapezoid of each trapezoidal prism-shaped tooth 690 have a size that is at least greater than a half in the thickness direction of the saw blade 520 (620).

With the triangle of the triangular prism-shaped tooth 580 or the trapezoid of the trapezoidal prism-shaped tooth 690 having a size that exceeds a half in the thickness direction of the saw blade 520 (620), when the triangular prism-shaped teeth 580 or the trapezoidal prism-shaped teeth 690 are arranged in alternating orientations one after another, it is ensured that, with preceding and trailing teeth 580 and 580 (690 and 690) as a pair, there is no portion within the thickness of the saw blade 520 (620) in which the saw is unable to cut an object.

Figure 2:
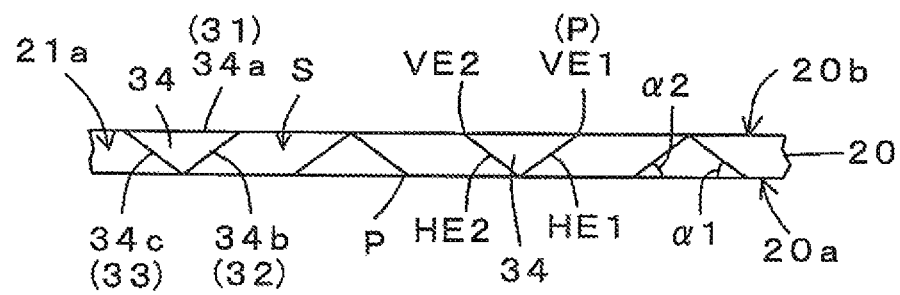
FIG. 2 shows details of the handsaw according to the first embodiment of the present invention, where (A) is a plan view and (B) is a front view.
Figure 2:
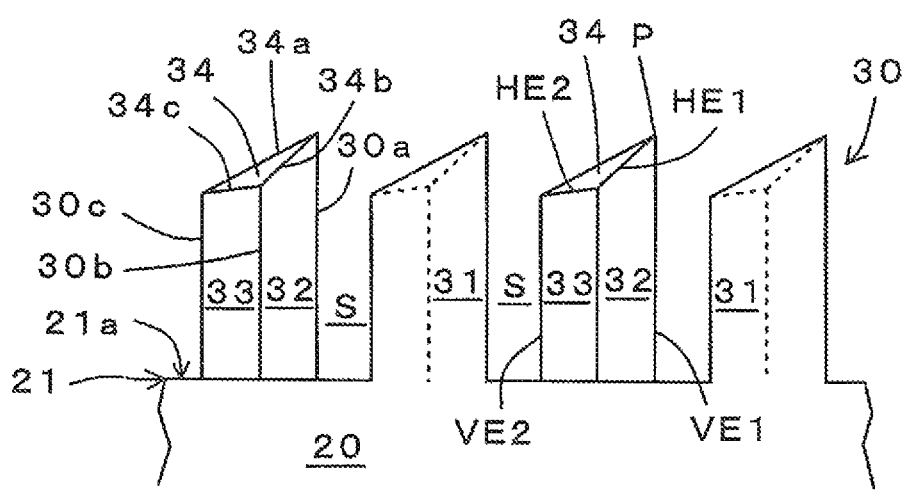
Figure 2:
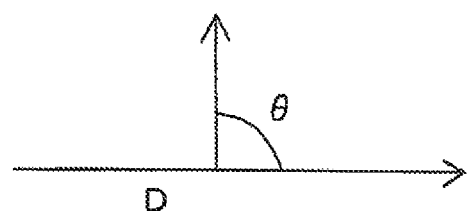
Figure 3:
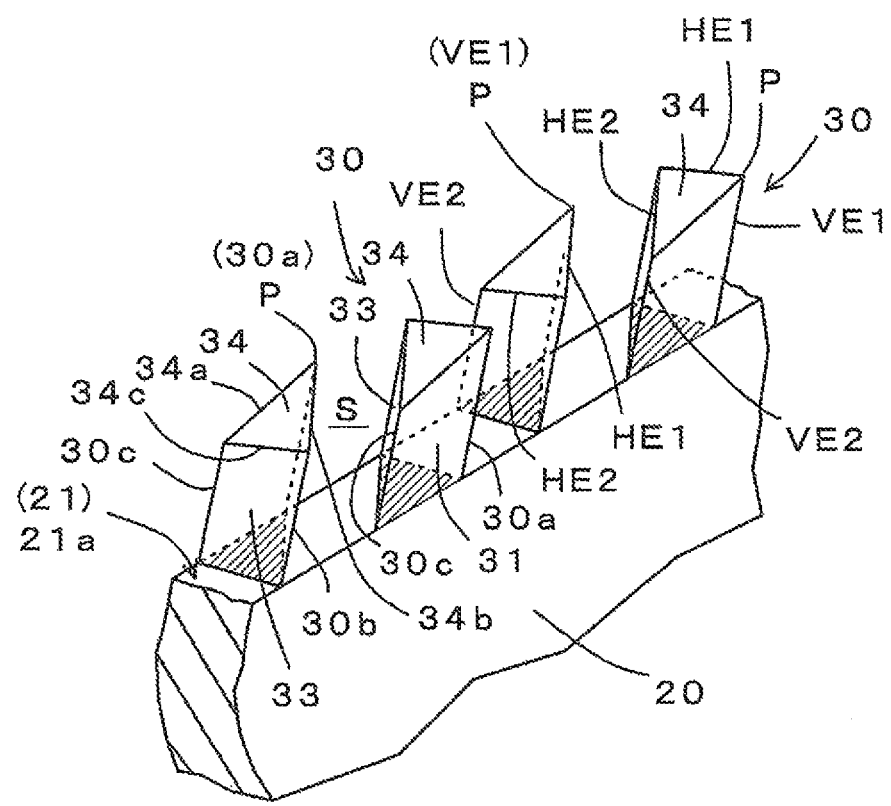
FIG. 3 is a perspective view showing details of the handsaw according to the first embodiment of the present invention.
Figure 4:
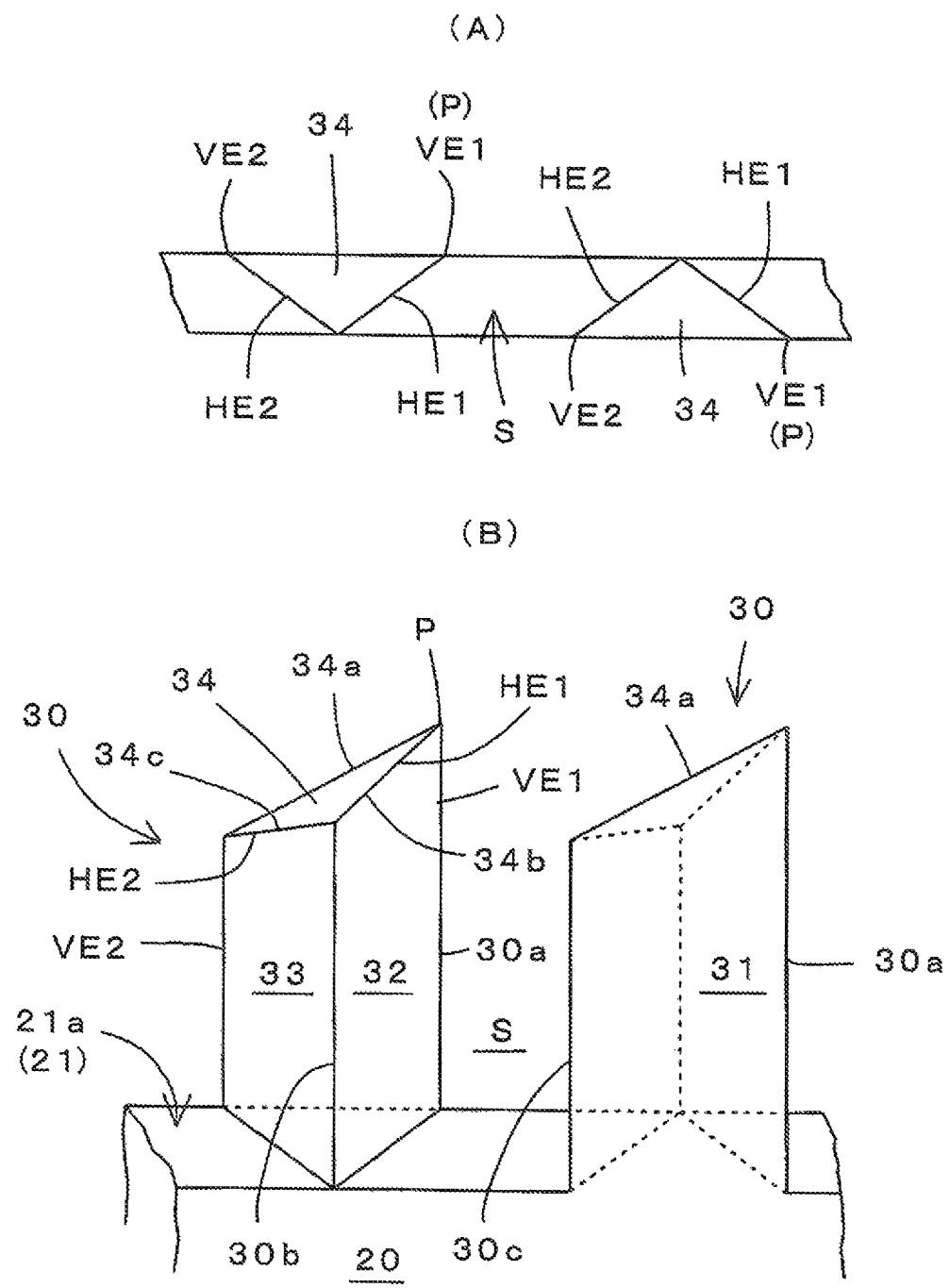
FIG. 4 shows saw teeth of the handsaw according to the first embodiment of the present invention, where (A) is a plan view and (B) is a perspective view observed from the front side.
Figure 5:
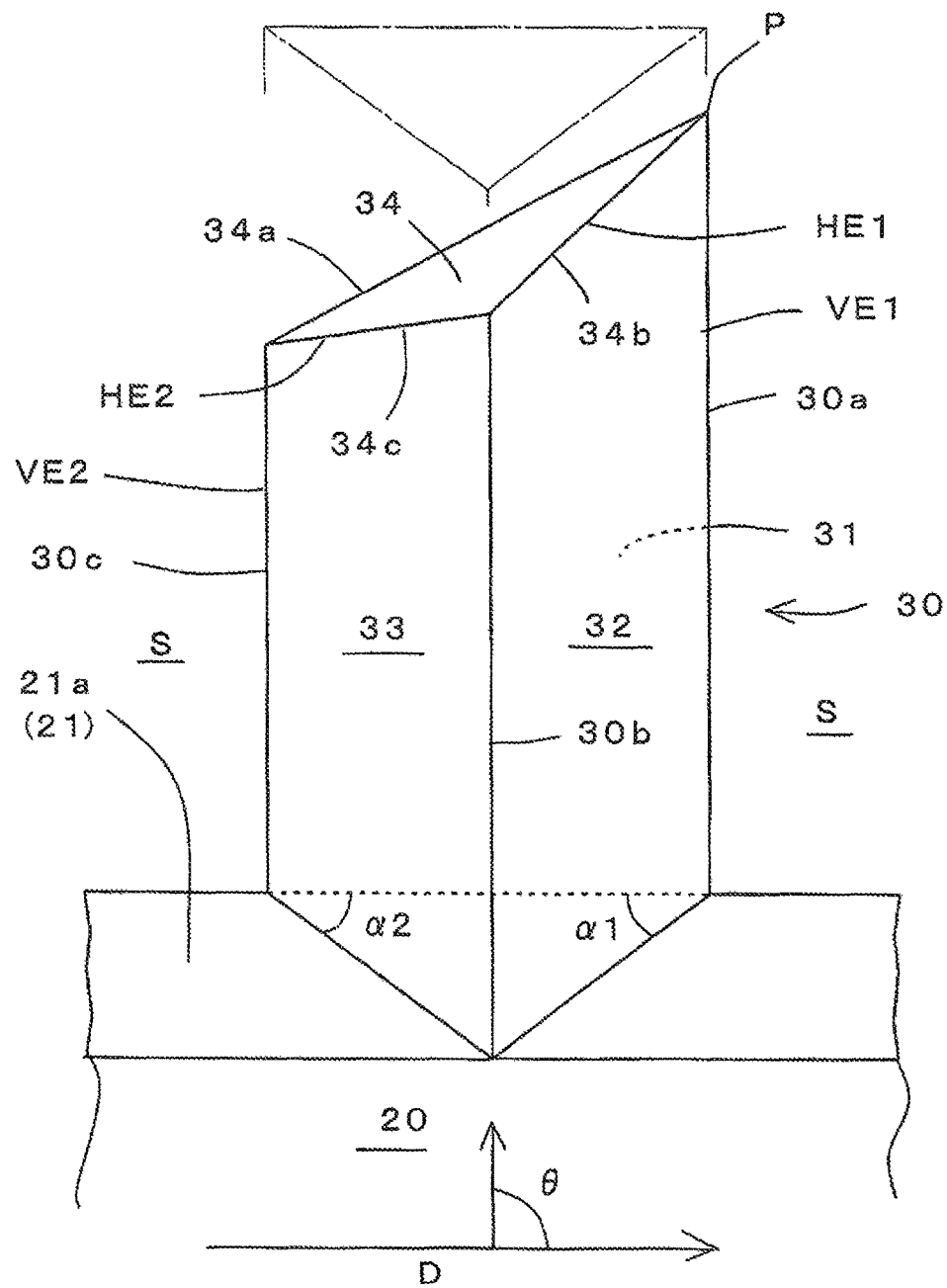
FIG. 5 shows dimensional relationships of respective parts of the saw tooth of the handsaw according to the first embodiment of the present invention.

It can be said that it is of course preferable that the triangle or the trapezoid is formed to extend across the saw blade 520 (620) in its thickness direction from the front surface 520a (620a) to the back surface 520b (620b), as in the cases of the triangular prism-shaped teeth 30, 250 and the trapezoidal prism-shaped teeth 140 shown in FIGS. 2 (A), 4 (A), 6 (A), and 7 (A).

A description will further be made primarily about the permissible ranges for the dimensional relationships among the parts constituting the handsaw according to each embodiment of the present invention.

First, the rising angle θ of each prism-shaped tooth 30 (140, 250) from the edge surface 21a (121a, 221a) of the longitudinal edge 21 (121, 221) of the saw blade 20 (120, 220) will be mentioned. The rising angle θ may be set to, for example, 90 degrees (perpendicular), or a constant angle tilted by a certain angle in the longitudinal direction. The constant rising angle θ, however, is not required to be a strictly precise angle for all the prism-shaped teeth 30 (140, 250) being arranged. For each prism-shaped tooth 30 (140, 250) arranged, the rising angle θ with a difference within ±10 degrees is considered to be within tolerance, and is included in the constant rising angle θ. The difference within ±10 degrees of the rising angle θ of each prism-shaped tooth 30 (140, 250) results in an enlargement or reduction of the space S (1S, 2S) between the adjacent prism-shaped teeth 30 (140, 250), within 20 degrees in the rising direction of the space S (1S, 2S). The variation within such a range, however, does not create an adverse result that the spaces S (1S, 2S) between the teeth are clogged with chips, or does not adversely affect the cutting performance of the saw.

Alternatively, the prism-shaped teeth 30 (140, 250) may be arranged such that the rising angle θ changes gradually in the longitudinal direction of the saw blade 20 (120, 220). In such a case, it is expected that the tooth on one end and the tooth on the other end in the longitudinal direction of the saw blade 20 (120, 220) will have their rising angles θ considerably different from each other. For a respective pair of adjacent prism-shaped teeth 30 (140, 250), however, their rising angles θ are almost the same. In this case, it can be said that the space S (1S, 2S) between the adjacent prism-shaped teeth 30 (140, 250) is substantially constant in the teeth rising direction. Thus, such a teeth arrangement is also within the scope of the present invention.

The space S (1S, 2S) between the adjacent prism-shaped teeth 30 (140, 250) will be mentioned. For this space S (1S, 2S) as well, although the space S (1S, 2S) is set to be constant in the rising direction, any space with an increase within 20 degrees in angle or a reduction within 20 degrees in angle can be considered to be within a permissible range, and included in the constant space. This is because, when the rising angle θ of each prism-shaped tooth 30 (140, 250) has a difference within ±10 degrees, the space S (1S, 2S) between the prism-shaped teeth correspondingly increases or decreases within 20 degrees in angle in the rising direction. The enlargement or reduction of the space S (1S, 2S) within such a range, however, does not create an adverse result that the spaces S (1S, 2S) between the teeth are clogged with chips, or does not adversely affect the cutting performance of the saw.

It is more preferable that the variation in the rising angles θ of the prism-shaped teeth 30 (140, 250) is within ±5 degrees. That is, it is more preferable that the rising angles θ of the prism-shaped teeth 30 (140, 250) are set to be constant with a tolerance of ±5 degrees. Correspondingly, it is preferable that the space S (1S, 2S) between the adjacent prism-shaped teeth 30 (140, 250) is set to be constant including an increase within ten degrees in angle and a reduction within ten degrees in angle in the rising direction. When the changes in the spaces S (1S, 2S) between the prism-shaped teeth are within the permissible range of ten degrees in the rising direction, chip clogging in the spaces S (1S, 2S) between the teeth can be prevented sufficiently effectively, making it possible to keep sufficiently good cutting performance. Accordingly, any handsaws using the prism-shaped teeth falling within the permissible ranges as described above are also within the scope of the present invention.

For each of the lateral faces 31, 32, 33 (141, 142, 143, 145, 251, 252, 253) of the respective prism-shaped teeth 30 (140, 250), the lateral edges on its both sides, i.e. 30a and 30c, 30a and 30b, 30b and 30c (140a and 140c, 140a and 140b, 140b and 140d, 140c and 140d, 250a and 250c, 250a and 250b, 250b and 250c), are configured to be parallel to each other. However, they do not have to be precisely parallel; they may be configured to rise obliquely at a crossing angle of within ±10 degrees from the parallel. That is, the present invention embraces the case where the lateral edges of each lateral face rise obliquely at a crossing angle of within ±10 degrees from the parallel.

Although it is necessary in a strict sense that the lateral edges of every lateral face are parallel to each other in the prism-shaped teeth 30 (140, 250), when the displacement from the parallel is relatively small, or, when the displacement is within ±10 degrees from the parallel, then the teeth can exert the geometric characteristics as the prism-shaped teeth. They do not create an adverse result that the spaces between the teeth are clogged with chips, or do not adversely affect the cutting performance of the saw. Accordingly, the prism-shaped teeth falling within such a range are also regarded as the prism-shaped teeth of the present invention.

It is preferable that, for each of the lateral faces 31, 32, 33 (141, 142, 143, 145, 251, 252, 253) of the respective prism-shaped teeth 30 (140, 250), the lateral edges on its both sides, i.e. 30a and 30c, 30a and 30b, 30b and 30c (140a and 140c, 140a and 140b, 140b and 140d, 140c and 140d, 250a and 250c, 250a and 250b, 250b and 250c), are configured to be parallel to each other, or if not parallel, at a crossing angle of within ±5 degrees from the parallel. This is because, when the reduction or enlargement of each of the prism-shaped teeth in the rising direction of the prism falls within the range of ±5 degrees, the teeth can sufficiently exert the geometric characteristics as the prism-shaped teeth, and it is possible to sufficiently effectively prevent chip clogging in the spaces between the teeth, and to keep sufficiently favorable cutting performance of the saw.

It should be noted that the thickness of the saw blade 20 (120, 220, 320, 420, 520, 620) itself may be slightly increased near the edge of the saw blade where the teeth 30, 140, 250, 360, 470, 580, or 690 are to be formed, compared to the middle of the saw blade. This is for the purposes of reducing friction between the saw blade 20 (120, 220, 320, 420, 520, 620) and the object to be cut during the cutting operation. When such a configuration is adopted, each tooth 30, 140, 250, 360, 470, 580, or 690 may become a mushroom-shaped prism tooth which slightly expands from the base toward the tip end of the tooth like a mushroom. The prism tooth of such a mushroom shape is also regarded as the prism-shaped tooth according to the present invention.

INDUSTRIAL APPLICABILITY

The handsaw according to the present invention has an industrial application as means for manually cutting wood, plastic, or other objects.

DESCRIPTION OF THE REFERENCE CHARACTERS 10 grip
20 saw blade
20a front surface of saw blade
20b back surface of saw blade
21 longitudinal edge of saw blade
21a edge surface of longitudinal edge of saw blade
30 triangular prism-shaped tooth
30a to 30c lateral edge of triangular prism-shaped tooth
31 flush lateral face of triangular prism-shaped tooth
32, 33 lateral face of triangular prism-shaped tooth
34 obliquely cut end face
34a to 34c edge
140 trapezoidal prism-shaped tooth
140a to 140d lateral edge of trapezoidal prism-shaped tooth
141 flush lateral face of trapezoidal prism-shaped tooth
142, 143 lateral face of trapezoidal prism-shaped tooth
144 obliquely cut end face
144a to 144d edge
145 second flush lateral face of trapezoidal prism-shaped tooth
250 oblique prism-shaped tooth
250a to 250c lateral edge of oblique prism-shaped tooth
251 flush lateral face of oblique prism-shaped tooth
252, 253 lateral face of oblique prism-shaped tooth
254 obliquely cut end face 254a to 254c edge
360 triangular prism-shaped tooth
360fe front end
360re rear end
470 trapezoidal prism-shaped tooth
470fe front end
470re rear end
580 triangular prism-shaped tooth
690 trapezoidal prism-shaped tooth
α1, α2 crossing angle of flush lateral face with respective 1α1, lag adjacent lateral face
θ rising angle
D cutting direction
P, 1P, 2P, 7P, 8P apex
S, 1S, 2S, 3S, 4S, 5S, 6S space
VE1, 1VE1, 2VE1 front vertical cutting edge
VE2, 1VE2, 2VE2 rear vertical cutting edge
HE1, 1HE1, 2HE1, 5HE1, 6HE1 front horizontal cutting edge
HE2, 1HE2, 2HE2, 5HE2, 6HE2 rear horizontal cutting edge

What is claimed is:

1. A handsaw having a plurality of saw teeth arranged on a longitudinal edge of a saw blade, the saw teeth being configured as prism-shaped teeth each having a shape of a prism, the prism-shaped teeth being configured such that at least adjacent prism-shaped teeth rise at a same rising angle from an edge surface of the longitudinal edge of the saw blade, to cause spaces between the adjacent prism-shaped teeth to be constant in a rising direction in which the prism-shaped teeth rise; wherein the prism-shaped teeth are triangular prism-shaped teeth that extend from the longitudinal edge of the saw blade, each of said prism-shaped teeth having an obliquely cut end face, three parallel lateral edges, and three intersecting lateral faces, each of the lateral faces bordered by two of the three parallel lateral edges, and said prism-shaped teeth being separated from each other by respective planar surfaces of the longitudinal edge of the saw blade, the three parallel lateral edges of each triangular prism-shaped tooth including two lateral edges configured as lateral edges of a flush lateral face of the three intersecting lateral faces, the flush lateral face rises flush with one of front and back surfaces of the saw blade, and a remaining lateral edge of the three parallel lateral edges has said spaces on both sides and is configured as a lateral edge that is parallel to the two lateral edges of the flush lateral face and that rises flush with the other of the front and back surfaces of the saw blade;

the triangular prism-shaped teeth are arranged in alternating orientations one after another such that the flush lateral faces of the respective teeth are located alternately on the front and back surfaces of the saw blade;

each triangular prism-shaped tooth has the obliquely cut end face at a tip end of the tooth obtained by obliquely truncating the triangular prism-shaped tooth, the obliquely cut end face having an oblique triangle that spans an entire thickness of the saw blade between the front and back surfaces;

among the three parallel lateral edges of each triangular prism-shaped tooth, each of both lateral edges belonging to the flush lateral face has a vertical cutting edge formed thereon; and among edges belonging to the obliquely cut end face of each triangular prism-shaped tooth, each of the edges not belonging to the flush lateral face has a horizontal cutting edge formed thereon.

2. The handsaw according to claim 1, wherein the same rising angle of each of the adjacent prism-shaped teeth has a tolerance of ±5 degrees, and each of the spaces between the adjacent prism-shaped teeth being constant in the rising direction includes any space with an increase within 10 degrees in angle or a reduction within 10 degrees in angle.

3. The handsaw according to claim 1, wherein the lateral edges of each lateral face of each prism-shaped tooth are configured to rise parallel to each other or at a crossing angle of within ±5 degrees from the parallel.

4. The handsaw according to claim 1, wherein the triangular prism-shaped teeth are isosceles triangular prism-shaped teeth.

5. The handsaw according to claim 4, wherein the same rising angle of each of the adjacent prism-shaped teeth has a tolerance of ±5 degrees, and each of the spaces between the adjacent prism-shaped teeth being constant in the rising direction includes any space with an increase within 10 degrees in angle or a reduction within 10 degrees in angle.

6. The handsaw according to claim 4, wherein the lateral edges of each lateral face of each triangular prism-shaped tooth are configured to rise parallel to each other or at a crossing angle of within ±5 degrees from the parallel.

* * * * *